United States Patent [19]

Duvenkamp

[11] Patent Number: 5,543,213
[45] Date of Patent: Aug. 6, 1996

[54] MOTOR VEHICLE SEAT CUSHION

[75] Inventor: Manfred Duvenkamp, Trebur, Germany

[73] Assignee: General Motors Corporation, Detroit, Mich.

[21] Appl. No.: 207,511

[22] Filed: Mar. 8, 1994

[30] Foreign Application Priority Data

May 8, 1993 [DE] Germany .................. 93 06 999.5 U

[51] Int. Cl.⁶ .................. A47C 7/02; B32B 5/04; B32B 7/08; B32B 7/14
[52] U.S. Cl. .................. 428/230; 5/655.9; 297/452.58; 297/DIG. 1; 428/236; 428/246; 428/264; 428/317.1; 428/318.4; 428/360; 428/212
[58] Field of Search .................. 428/253, 230, 428/297, 311.1, 317.1, 318.4, 233, 360, 212, 246, 236, 298, 316.6, 264; 5/481; 297/DIG. 1, 452.58

[56] References Cited

U.S. PATENT DOCUMENTS 4,486,493 12/1984 Burmester et al. .................. 428/253
5,248,185 9/1993 Weingartner et al. .................. 297/452.58
5,280,997 1/1994 Andres et al. .................. 297/284.9

FOREIGN PATENT DOCUMENTS 3220088 9/1983 Germany .
88/90731 12/1988 WIPO .

Primary Examiner—Marion E. McCamish
Assistant Examiner—Blaine R. Copenheaver
Attorney, Agent, or Firm—Ernest E. Helms

[57] ABSTRACT

An upholstery layer for a motor vehicle seat is provided in a preferred embodiment with a resilient bottom layer, for example of foam and/or rubberized hair, and on top of this a buffer layer covered by a seat cover fabric. The buffer layer consists of at least two further layers connected to each other in an almost nondisplaceable manner. One of these top layers is made from a particularly elastic material, and a layer situated beneath this or an intermediate layer is made from a less elastic steam-permeable material which supports the upper layer.

10 Claims, 1 Drawing Sheet

MOTOR VEHICLE SEAT CUSHION

FIELD OF THE INVENTION

The invention relates to a seat cushion, especially for a vehicle seat, with a lower resilient layer, e.g., of solid foam and/or rubberized hair, and an overlying vapor-permeable buffer layer which is covered with seat covering material.

BACKGROUND OF THE INVENTION

Cushions of the type mentioned are well known and generally installed in modern motor vehicles as seat cushions or backrest cushions. While the resilient layer is required for good shock absorption, the vapor-permeable buffer layer serves to absorb and carry off perspiration. The buffer layer may consist of cotton wadding, fleece or a similar elastic material.

In order to facilitate the installation of the seat, frequently between the buffer layer and the elastic layer or the spring, preformed supports are arranged, e.g., of rubberized hair, which are elastic and of stable shape and essentially conform to the basic shape of the seat for holding a person. Such supports may be arranged both on the seat cushion and on the backrest.

A cushion body for a vehicle seat is known in which the moisture accumulating in the buffer layer is rapidly carried off into the elastic material in other areas so that no moisture can build up in the case of prolonged use.

This is achieved by the fact that the cushion body consists of an elastic body, which is deformed in the loaded state and is thus air and moisture permeable, and a covering material mounted on it which is air permeable, arranged between the seat covering material and solid foam, in which case the seat cover material is backed by a buffer layer displaying a significant content of cellulose fibers, and the elastic body consists of fibers with hydrophilic properties which are combined to form a three dimensionally-oriented network and are glued at the crossing points.

This cushion body, however, has the disadvantage that the buffer layer is formed from a thin fleece that has relatively low shape stability and which must either be bonded to the underlying elastic body or to the seat cover material over its entire area.

It is the purpose of the invention to device a cushion support of the type mentioned initially which is designed in a simple environmentally-friendly manner with reduced production costs.

SUMMARY OF THE INVENTION

This problem is solved according to the present invention by the fact that the buffer layer consists of at least two additional, almost immovably bound together layers where the upper layer consists of an elastic and especially a vapor-permeable material and an underlying or intermediate layer of a less elastic, also vapor-permeable material which supports the upper layer.

The primary advantages achieved by the invention are the fact that the buffer layer of the cushion support is designed as a relatively shape-stable part which, depending on requirements, can be bound to the seat covering material. In this way, it is possible for all pans of the cushion support such as the buffer layer or the seat cover material to be manufactured separately from one another and to be transported and stored in a shape-stable manner until installed. The costs for production of the individual parts and their assembly are thus reduced.

Advantageously, the upper layer of the buffer layer consists of a pressure-elastic fiber fleece. This may, for example, consist of a polyester fleece and, for better removal of moisture, display fibers arranged predominantly perpendicular to the surface of the seat and which are bound to the underlying support material.

In an alternative version of the invention, the seat comfort can be further increased if the buffer layer consists of at least two layers immovably bound to one another where the upper of these layers consists of an especially elastic material and the underlying or intermediate layer consists of a less elastic vapor-permeable material which supports the upper layer.

By means of this construction, the buffer layer can be made especially elastic and soft. It also makes it possible to make seats with a relatively hard spring characteristic comfortable. The upper layer in this case may be designed as a polyurethane foam cushion or a similar material of low thickness and also be bound almost immovably to the seat cover material.

The nearly immovable bonds between the upper layer and the seat cover material or the underlying or intermediate layer are formed in an environmentally-friendly manner by point gluing or welding. The connecting points in this case may be distributed in a checkerboard pattern over the entire contact surfaces or at the stressed places. In this way, wrinkling on the seat surface or mutual displacement of the individual layers and the seat cover material is practically avoided. In the case of recycling, however, the individual layers can be separated from one another relatively easily.

These joints can be made in an especially environmentally-friendly manner if the seat cover material, the upper layer and the underlying or intermediate layer are connected by stitching. The textile joint formed in this way, depending on the strength or thickness and elasticity of the individual layers, may also be additionally bound by point gluing or welding.

The underlying or intermediate layer is suitable especially as a support material for the upper elastic layer if the latter consists advantageously of a vapor-permeable fabric material reinforced by natural or synthetic fibers. Other layers may also be arranged between this layer and the support of rubberized hair, in order to increase the moisture absorption, strength, shape stability, elasticity or heat removal.

The vapor permeability of the buffer layer according to the invention can be further improved if the upper layer and/or the underlying layer or intermediate layer display air passages which are designed, e.g., as holes arranged vertically with respect to the plane of the seating surface of the seat. In this way by relatively simple means, moisture and heat can be carried off rapidly into the support of rubberized hair and the drying of the seat cover material and the buffer layer accelerated.

Another advantage of the invention consists in the fact that the buffer layer is adapted to the shape of the support of rubberized hair. The seat cover material and/or the buffer layer in this case may be connected to the support of rubberized hair, e.g., by mechanical fasteners such as staples, quilting strips, holding clamps or wires or adhesive strips.

The invention permits a variety of versions. For further illustration of the basic principle, one of them is shown in the drawings and is described below.

DETAILED DESCRIPTION OF THE DRAWINGS

Figure 1:
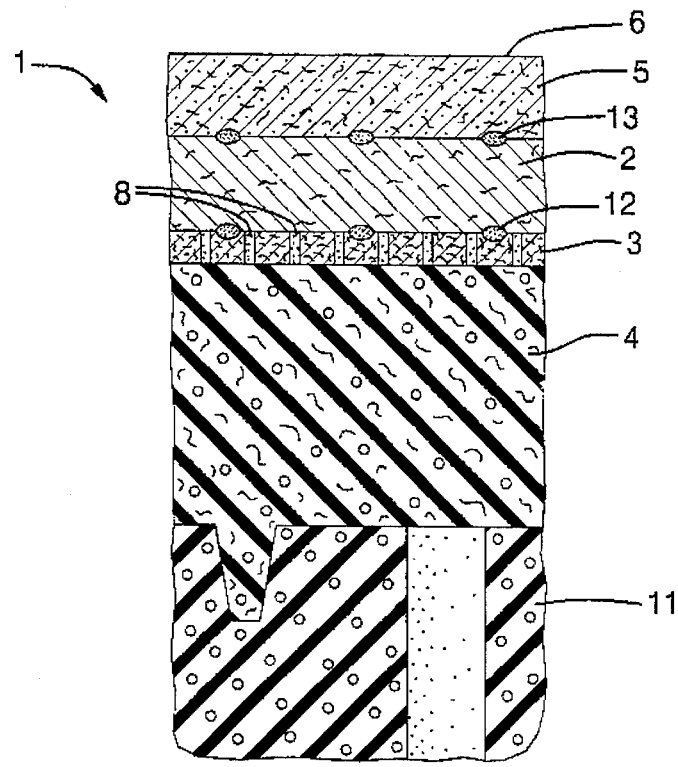
FIG. 1 shows a sectional representation of a seat part of a motor vehicle seat with the cushion support according to the invention.

FIG. 1 shows a cushion support 1 with a lower elastic layer of solid foam 11 which is bound to a support arranged above it composed of rubberized hair in a form-fitting manner. Above the support of rubberized hair 4, a buffer laminate 2, 3 is arranged which is covered by an exterior seat covering material 5. The buffer layer 2, 3 consists of first upper layer section 2, which is formed by an especially vapor-permeable and pressure-elastic fiber fleece, and a second lower layer section 3, which is formed of a less elastic vapor-permeable fabric material reinforced with natural or synthetic fibers. The lower layer 3 in this case has air passages 8 which are designed as holes arranged vertically to the seating plane of the seat surface cushion. The upper layer 2 and the lower layer 3 are joined almost totally non-relatively displaced or immovably together by glue or weld points 12 arranged in a checkerboard pattern. The seat cover material 5 is also connected to the upper layer 2 by glue or weld points 13 distributed in a checkerboard pattern.

Figure 2:
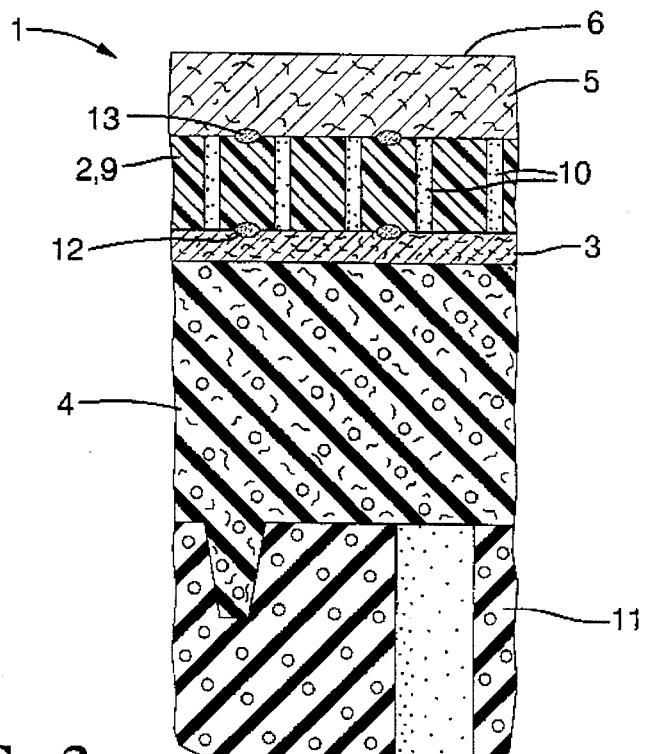
FIG. 2 is a sectional representation of an alternative design of the cushion support with a buffer layer which displays holes arranged vertically to the plane of the seat.

FIG. 2 illustrates the design of a cushion support 1 with a buffer layer 2, 3 in which, as an alternative to the design shown in FIG. 1, the upper layer 2 consists of an especially elastic polyurethane foam cushion 9. The polyurethane foam cushion 9 has air passages 10 in the form of holes arranged vertically to the seat plane 6. The polyurethane foam cushion 9 is also connected to the seat cover material 5 arranged above it and the underlying support fabric material 3 by point gluing or welding.

Although not shown in this design, it remains within the scope of the invention for the fabric 3, in order to improve the air exchange, to be provided with air passages which are designed as holes arranged vertically to the seat plane 6.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An automotive vehicle seat cushion comprising a resilient support layer, the resilient support layer being covered by an exterior seat cover fabric, the seat cushion having between the support layer and the exterior seat cover fabric an upholstery buffer laminate, the upholstery buffer laminate comprising:

at least upper and lower buffer layer sections bonded to each other, in which the upper buffer layer section is a pressure-elastic fiber fleece and the lower buffer layer section is a moisture-permeable material which supports the upper buffer layer section, and the lower buffer layer section material is less elastic than the upper buffer section material, said upper buffer layer section is bonded directly to the exterior seat cover fabric.

2. An automotive vehicle seat cushion according to claim 1, wherein the bond between the upper buffer layer section and the exterior seat cover fabric is achieved by spot welding.

3. An automotive vehicle seat cushion according to claim 1, wherein the exterior seat cover fabric and the buffer laminate are connected by sewing.

4. An automotive vehicle seat cushion according to claim 1, wherein the lower buffer layer section comprises a woven material reinforced with fibers.

5. An automotive vehicle seat cushion according to claim 1, wherein the buffer laminate is adapted to the shape of the resilient support layer.

6. An automotive vehicle seat cushion according to claim 5, wherein the buffer laminate is connected to the resilient support layer by a mechanical fastener.

7. An automotive vehicle seat cushion according to claim 1, wherein the pressure-elastic fiber fleece has fibers arranged substantially perpendicularly to the seating surface.

8. An automotive vehicle seat cushion according to claim 1, wherein a solid foam piece is bound underneath the resilient support layer.

9. An automotive vehicle seat cushion according to claim 1, wherein the resilient support layer is comprised of foam.

10. An automotive vehicle seat cushion according to claim 1, wherein the resilient support layer is comprised of rubberized hair.

\* \* \* \* \*